(12) United States Patent
Rosenring et al.

(10) Patent No.: US 12,529,620 B2
(45) Date of Patent: Jan. 20, 2026

(54) METHOD AND SYSTEM FOR LEAKAGE DETECTION IN A FLUID SYSTEM

(71) Applicant: Grundfos Holding A/S, Bjerringbro (DK)

(72) Inventors: Daniel Rosenring, Bjerringbro (DK); Lars Sund Mortensen, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 334 days.

(21) Appl. No.: 18/259,616

(22) PCT Filed: Dec. 20, 2021

(86) PCT No.: PCT/EP2021/086871
§ 371 (c)(1),
(2) Date: Jun. 28, 2023

(87) PCT Pub. No.: WO2022/144218
PCT Pub. Date: Jul. 7, 2022

(65) Prior Publication Data
US 2024/0210268 A1  Jun. 27, 2024

(30) Foreign Application Priority Data
Dec. 28, 2020 (DK) .............................. PA202070875

(51) Int. Cl.
*G01M 3/26* (2006.01)
(52) U.S. Cl.
CPC .................................... *G01M 3/26* (2013.01)

(58) Field of Classification Search
CPC ............ G01M 3/00; G01M 3/08; G01M 3/26; G01M 3/28; G01M 3/32
See application file for complete search history.

(56) References Cited

U.S. PATENT DOCUMENTS

| | | | |
|---|---|---|---|
| 3,665,945 | A | 5/1972 | Ottenstein |
| 3,851,521 | A | 12/1974 | Ottenstein |
| 4,796,466 | A | 1/1989 | Farmer |
| 7,010,925 | B2 | 3/2006 | Sienel et al. |
| 8,844,551 | B2 | 9/2014 | Doughty et al. |
| 9,939,344 | B2 | 4/2018 | Bracken et al. |

(Continued)

FOREIGN PATENT DOCUMENTS

| | | | |
|---|---|---|---|
| EP | 0925491 B1 | 5/2004 | |
| EP | 2307073 B1 | 7/2015 | |

(Continued)

*Primary Examiner* — Nguyen Q. Ha
(74) *Attorney, Agent, or Firm* — ICE MILLER LLP; Justin D. Swindells

(57) ABSTRACT

A method for detecting leakage in a fluid system, comprising: receiving a pressure signal indicative of measured pressure values of a pressure in the fluid system measured at different points in time; determining a first filtered pressure signal indicative of variations of the measured pressure values over a first time scale; determining a second filtered pressure signal indicative of variations of the measured pressure values over a second time scale, shorter than the first time scale; outputting a leakage warning based on a comparison of the first filtered pressure signal and the second filtered pressure signal.

19 Claims, 5 Drawing Sheets

(56) References Cited

U.S. PATENT DOCUMENTS

| | | |
|---|---|---|
| 10,352,814 B2 | 7/2019 | Enev |
| 2010/0280665 A1 | 11/2010 | Fildes et al. |
| 2014/0121999 A1 | 5/2014 | Bracken et al. |
| 2017/0131174 A1 | 5/2017 | Enev et al. |
| 2017/0308796 A1* | 10/2017 | Heng ............... G06N 20/00 |
| 2019/0170396 A1 | 6/2019 | Azulay et al. |
| 2021/0096037 A1* | 4/2021 | Kanniganti ......... G01M 3/2815 |

FOREIGN PATENT DOCUMENTS

| | | |
|---|---|---|
| EP | 3256834 B1 | 5/2019 |
| WO | 2009025558 A1 | 2/2009 |

\* cited by examiner

METHOD AND SYSTEM FOR LEAKAGE DETECTION IN A FLUID SYSTEM

CROSS-REFERENCE TO RELATED PATENT APPLICATIONS

This is a U.S. National Phase Application under 35 U.S.C. § 371 of International Patent Application No. PCT/EP2021/086871, filed Dec. 20, 2021, which claims priority to Denmark Patent Application No. PA202070875, filed Dec. 28, 2020, which is incorporated by reference in its entirety. The International Application was published on Jul. 7, 2022, as International Publication No. WO 2022/144218A1.

TECHNICAL FIELD

The present invention relates to leakage detection in a fluid system, in particular in a closed-loop fluid system in which a fluid is circulated through a closed loop, such as a heating or cooling system.

BACKGROUND

Closed-loop fluid systems are frequently used for heating or cooling. In such systems, a fluid, such as a liquid, is circulated in the loop and used to add or remove thermal energy inside buildings or other structures.

The owner or operator of a heating or cooling system normally expects the system to work reliably at all times. System failures may have a serious negative impact on the indoor climate or even cause damage to the building or other structure.

Examples of failures that can occur in a heating or cooling system include malfunction of an expansion vessel of the system which may result in the system losing liquid through a safety valve. Other possible failures include the system leaking water due to a burst pipe, due to small leakages caused by corrosion or because the assembled system is leaking slightly. Sometimes the liquid is dripping on the floor when a leakage occurs, but the leakage may also be so small that leaking fluid evaporates from the system. Bursts can lead to damages to the surroundings, which is highly undesirable. Therefore, it is desirable to detect leakage as fast as possible so as to be able to minimize undesirable consequences of the leakage.

U.S. Pat. No. 8,844,551 discloses a leak detection method for a closed-volume system. This prior art method performs leak detection using pressure signals and level signals. The pressure signal is evaluated based on the rate at which the pressure signal changes to determine a pressure drop from a leak.

However, even in a heating system without leakages, the system pressure typically varies, e.g. due to variations in the system temperature. Accordingly, it remains desirable to provide a leak detection that is reliable and accurate. Moreover, it is desirable to provide a leakage detection that is flexible and works under different conditions and/or under varying conditions. Yet further, it is desirable to provide leakage detection that relies on few sensors and/or that otherwise can be implemented in a cost-efficient manner.

SUMMARY

Thus, it remains desirable to provide a leakage detection method and system that solve one or more of the above problems and/or that have other benefits, or that at least provide an alternative to existing solutions.

According to one aspect, disclosed herein are embodiments of a method for detecting leakage in a fluid system, in particular in a closed loop fluid system such as a heating or cooling system. Embodiments of the method comprise:
  receiving a pressure signal indicative of measured pressure values of a pressure in the fluid system measured at different points in time;
  determining a first filtered pressure signal indicative of variations of the measured pressure values over a first time scale;
  determining a second filtered pressure signal indicative of variations of the measured pressure values over a second time scale, shorter than the first time scale;
  computing a width of an operating range of the measured pressure values relative to the first filtered pressure signal;
  computing a deviation of the second filtered pressure signal from the first filtered pressure signal;
  outputting a leakage warning based completely or in part on a comparison of the computed deviation and the computed width of the operating range.

Accordingly, the leakage warning is based on a comparison of two filtered pressure signals that are indicative of variations of the measured pressure values over different time scales. The measured pressure values may be indicative of a system pressure of the fluid system, in particular a pressure of the fluid being circulated in the fluid system. In particular, embodiments of the method described herein determine normal variations of the system pressure in the particular fluid system on which it is operating, in particular long-term temperature-dependent variations of the pressure. Embodiments of the method disclosed herein then create a leakage warning based on a comparison of short-term variations relative to the long-term variations. The process is thus more robust over normal variations of the system pressure, in particular over slowly varying pressure changes, e.g. due to seasonal temperature changes. Accordingly, embodiments of the process described herein provides a reliable detection of leakage while avoiding false positive alarms. At least some embodiments of the method disclosed herein may perform leakage detection based only on the measured pressure signal, i.e. without any need for additional input from other types of sensors, such as sensors for measuring fluid levels, flow rates, temperature, etc. Nevertheless, in some embodiments, additional input from one or more such sensors may be used to advantage.

Embodiments of the method disclosed herein are capable of reliably detecting leakage in a fluid system, in particular a closed loop fluid system. The detected leakage may be caused by various types of leaks such as by an unintended hole, a crack, a joint not being sufficiently tight, a corroding wall of a conduit or vessel, and/or the like, through which fluid may escape from the fluid system.

According to some embodiments, the operating range defines an upper envelope, larger than the first filtered pressure signal, and a lower envelope, smaller than the first filtered pressure signal. The upper envelope of the pressure signal is a curve outlining the maxima of the varying pressure signal in the time-domain. The lower envelope of the pressure signal is a curve outlining the minima of the varying pressure signal in the time-domain.

Accordingly, the process determines a typical operating range of the pressure signal around the first filtered pressure signal, i.e. a range or band around the first filtered pressure signal within which the pressure values can be expected to vary over time during normal operation, i.e. even in the absence of a leak. The process is thus more robust over normal variations of the system pressure, including over normal pressure changes that may occur over relatively short time scales, e.g. due to temperature changes occurring during the course of a day or week.

In some embodiments, outputting the leakage warning comprises detecting one or more leakage-indicating events based on the comparison. Each leakage-indicating event may e.g. complete or partly be defined by the second filtered pressure signal having a value smaller than the lower envelope—or by the ratio of the second filtered pressure value relative to the lower envelope being smaller than a predetermined threshold ratio, where the threshold ratio may be 1 or different from 1. In some embodiments, a leakage-indicating event may be defined by the second filtered pressure signal having a value smaller than the lower envelope and by one or more additional trigger conditions also being fulfilled. Hence, the process detects leakage-indicating events when the faster varying second filtered pressure signal is much smaller than the slower varying first filtered pressure signal, i.e. when the second filtered pressure signal is smaller than the first filtered pressure signal and outside a determined normal operating range around the first filtered pressure signal. In particular, in some embodiments, only downward deviations of the second filtered pressure signal are detected as a leakage-indicating event, i.e. only when the second filtered pressure signal is smaller than the lower envelope.

In some embodiments, outputting the leakage warning comprises counting a number of detected one or more leakage-indicating events and outputting the leakage warning based on the counted number of detected events, in particular responsive to the counted number exceeding a threshold. Accordingly, a leakage warning is output responsive to a repeated downward deviation of the second filtered pressure signal outside the normal operating range, thus avoiding false positive leakage warnings caused by isolated outliers.

In some embodiments, computing the width of the operating range comprises computing the width as a width between the upper envelope and the first filtered pressure signal. In particular, computing the width of the operating range may comprise computing the upper envelope from the measured pressure signal and computing the width as a difference between the computed upper envelope and the first filtered pressure signal. The lower envelope may then be computed from the first filtered pressure signal and the computed width, in particular by subtracting the computed width from the first filtered pressure signal. Accordingly, an accurate determination of the width of the normal operating range is obtained since upward variations due to e.g. temperature fluctuations are less likely influenced by leakage. In particular, assuming zero-mean fluctuations around the slowly varying first filtered pressure signal, the upper envelope may be mirrored relative to the first filtered pressure signal so as to obtain the lower envelope.

In some embodiments, the method further comprises outputting a filling warning when the lower envelope is smaller than a predetermined threshold, e.g. smaller than an absolute threshold, such as 1 bar, or smaller than a relative threshold, e.g. a predetermined fraction of the peak value of the first filtered signal. In particular, as the filling warning is based on the lower envelope, an early warning is created while avoiding false positive warnings based on isolated outliers. The predetermined, threshold may be set during commissioning of the system or calculated based on measured pressure values, or it may be set to a default constant such as 1 bar.

In some embodiments, computing the width of the operating range comprises reducing the width responsive to the width exceeding a width threshold. Accordingly an undesired wind up of the calculated width of the operating range over time due to isolated high pressure values is avoided.

The present disclosure relates to different aspects including the method described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, the method disclosed herein may be computer-implemented. Accordingly, disclosed herein are embodiments of a data processing system configured to perform the steps of the method described herein. In particular, the data processing system may have stored thereon program code adapted to cause, when executed by the data processing system, the data processing system to perform the steps of the method described herein. The data processing system may be embodied as a single computer or other data processing device, or as a distributed system including multiple computers and/or other data processing devices, e.g. a client-server system, a cloud based system, etc. The data processing system may include a data storage device for storing the computer program and detector data. The data processing system may include a communications interface for receiving pressure values and/or other types of sensor data. In some embodiments, the data processing system may partly or completely be embodied as a suitably programmed or otherwise configured processing unit, e.g. a pump controller, for controlling operation of a pump comprised in the fluid system. Accordingly, a part of the data processing system or the whole data processing system may be accommodated in a housing of the pump. Alternatively or additionally, the data processing system may include one or more data processing apparatus external to the pump. The data processing system may receive a pressure signal from a pressure sensor as input to the leakage detection process. The pressure sensor may be positioned at a suitable position within the fluid system and configured to measure a system pressure of the fluid system. The data processing system may receive the pressure signal from the external pressure sensor via a suitable wired or wireless communicative connection, e.g. directly from the pressure sensor or indirectly via one or more intermediate nodes.

Accordingly, according to one aspect, disclosed herein are embodiments of a pump for use in a fluid system, the pump comprising a processing unit configured to control operation of the pump; wherein the processing unit is further configured to perform the steps of the method described herein. The pump may comprise one or more fluid-moving components and a pump motor configured to drive the one or more fluid-moving components of the pump. The pump may further comprise a drive circuit controlling the pump motor. The processing unit of the pump may be separate from, or integrated into the drive circuit of the pump, e.g. into a drive circuit controlling the pump motor. Accordingly, the drive circuit or a separate processing unit of the pump may be suitably programmed to perform an embodiment of the process described herein, either alone as a stand-alone device or as part of a distributed data processing system, e.g. in cooperation with an external data processing system such as with a portable data processing device and/or with a remote host computer and/or with a cloud-based architecture. The pump may further include an integrated pressure sensor configured to measure a pressure of the fluid being pumped. The processing unit may thus receive a pressure signal from the integrated pressure sensor as input to the leakage detection process. Alternatively, the pump may receive a pressure signal from an external pressure sensor, external to the pump, as input to the leakage detection process. The external pressure sensor may be positioned at a suitable position within the fluid system and configured to measure a system pressure of the fluid system. The processing unit may receive the pressure signal from the external pressure sensor via a suitable wired or wireless communicative connection.

According to yet another aspect, a fluid system comprises a pressure sensor and a data processing system communicatively coupled to the pressure sensor; wherein the data processing system is configured to perform the steps of the method described herein.

Yet another aspect disclosed herein relates to embodiments of a computer program configured to cause a data processing system to perform the acts of the method described above and in the following. A computer program may comprise program code means adapted to cause a data processing system to perform the acts of the method disclosed above and in the following when the program code means are executed on the data processing system. The computer program may be stored on a computer-readable storage medium, in particular a non-transient storage medium, or embodied as a data signal. The non-transient storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

Preferred embodiments will be described in more detail in connection with the appended drawings, where FIG. 1 schematically shows an embodiment of a fluid system.

DETAILED DESCRIPTION

Figure 1:
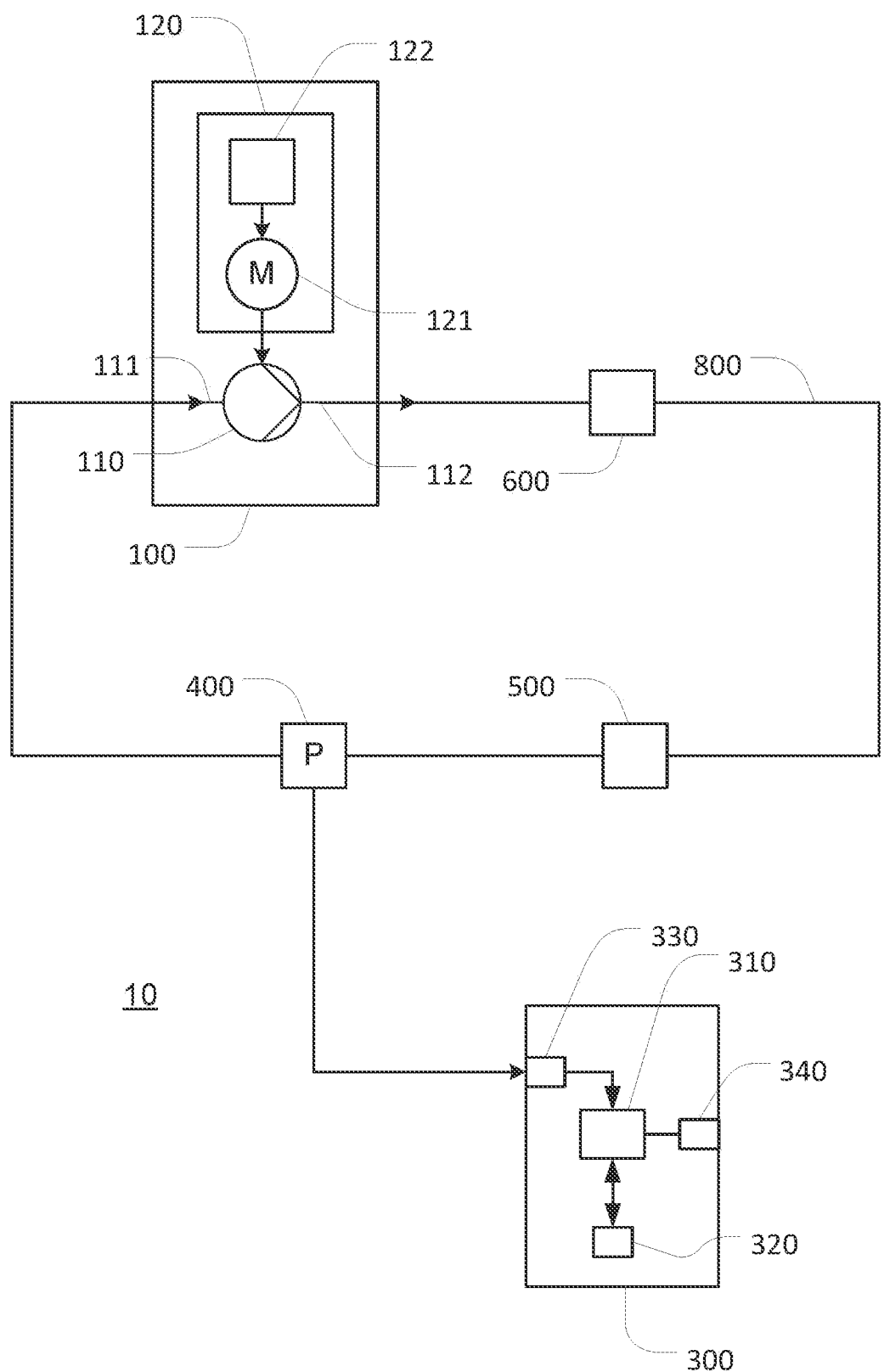

FIG. 1 schematically shows an embodiment of a fluid system, generally designated by reference numeral 10. The fluid system is configured to circulate a fluid, such as a liquid, e.g. water, in a closed loop through one or more fluid conduits 800, in particular through one or more pipes. The system 10 comprises a pump 100 and/or other apparatus for moving the fluid through the closed loop system. The fluid system of FIG. 1 may be a heating or cooling system where a fluid is circulated in the loop and used to add or remove thermal energy inside buildings or other structures.

The pump 100 comprises a fluid displacement mechanism 110 and a pump drive 120. The fluid displacement mechanism 110 may be a centrifugal pump mechanism or a different type of pump mechanism. The fluid displacement mechanism 110 has an inlet 111 for suction of water or a different fluid, such as of a different liquid. The fluid displacement mechanism 110 also has an outlet 112 for providing the output flow of the pump. The pump drive 120 comprises a motor 121, such as an electrical motor, and a motor drive circuit 122. The motor drive circuit may include a frequency converter for supplying the motor with electrical energy and/or other circuitry for controlling operation of the motor 121. The motor drive circuit may be connectable to a suitable power supply (not shown) in order to supply the drive circuit, e.g. a frequency converter, with electric energy. During operation, the motor 121 causes the fluid displacement mechanism to pump fluid from the inlet 111 to the outlet 112 at a flow rate. It will be appreciated that other embodiments of a fluid system may include a different type of pump and/or additional pumps.

The fluid system may further include additional components, e.g. one or more radiators 500, and expansion vessel 600 and/or other components, such as pipes, valves, fluid reservoirs, pumps, sensors, boilers, etc. Some or all of the additional components may be directly or indirectly operationally coupled to the pump 100, e.g. be in fluid communication with the pump 100.

The fluid system further comprises a pressure sensor 400 configured to measure a fluid pressure of the fluid in the system, or otherwise a pressure indicative of the pressure of the fluid in the system. While shown as a separate component in FIG. 1, it will be appreciated that, in some embodiments, the pressure sensor may be integrated with the pump or with another component of the fluid system, e.g. an expansion vessel, a valve, etc. For example, in some embodiments, the fluid system is a heating and/or cooling system which may include an expansion vessel 600 to absorb the pressure changes from temperature variations. The pressure sensor may be mounted to the expansion vessel. The pressure sensor may e.g. be configured to measure the pressure at the air side of the expansion vessel. To this end, the pressure sensor can be installed directly on the valve used for adjusting the pre-charge pressure or on a splitter that is mounted on this valve. The latter solution has the advantage that the expansion vessel can be pre-charged without removing the air pressure sensor. Moreover, installing a pressure sensor connected to an expansion vessel, in particular the air side of an expansion vessel, is relatively easy. In other embodiments, the pressure sensor is configured to measure the pressure of the fluid, such as water, being circulated directly. It will be appreciated that some embodiments of a fluid system may include multiple pressure sensors.

The fluid system of FIG. 1 further comprises a data processing system 300. The data processing system 300 may be a suitably programmed computer or other data processing device. In some embodiments, the data processing system 300 may be a distributed system including more than one computer. For example, the data processing system may be a control system configured to control the fluid system or it may be another type of local or remote data processing system. The data processing system 300 is communicatively coupled to the pressure sensor 400, e.g. via a wired or wireless connection, and configured to receive a pressure signal indicative of measured pressure values from the pressure sensor, e.g. continuously, quasi-continuously, or intermittently, such as periodically. The communication between the pressure sensor 400 and the data processing system 300 may be a direct communication or an indirect communication, e.g. via one or more nodes of a communications network. Examples of a wired connection include a local area network, a serial communications link, etc. Examples of wireless connections include a radio frequency communications link, e.g. Wifi, Bluetooth, cellular communication, etc. In some embodiments, communication between the pressure sensor 400 and the data processing system may be via the internet. To this end, the pressure sensor 400 may be an IoT enabled sensor and/or the pressure sensor 400 may be connected to a local gateway device which in turn is configured to communicate with the data processing system 300.

The data processing system 300 comprises a suitably programmed processing unit 310, such as a CPU, and a memory 320. The memory has stored thereon a computer program and/or data for use by the processing unit 310.

Optionally, the data processing system 300 comprises a user-interface 340, e.g. including a graphical user-interface displayed on a display of the data processing system such as on a touch screen.

The data processing system 300 may receive measured pressure values from the pressure sensor 400, either continuously or intermittently, e.g. periodically, e.g. such that the data processing system receives a time series of measured pressure values indicative of a pressure of the fluid at different points in time. The pressure sensor 400 or an intermediary device may transmit the measured pressure values automatically or upon request from the data processing system. Each pressure value may be associated with a time stamp. The data processing system 300 may further receive additional data from the fluid system.

The processing unit 310 is programmed to perform a leakage detection process as described herein, e.g. the leakage detection process described in connection with FIGS. 3-7 below. Upon detection of leakage and/or upon occurrence of another event, e.g. an event triggering a fill warning, the data processing system 300 may output an alarm or other suitable notification via the user interface 340. Alternatively or additionally, the data processing system may send a leakage alarm or warning and/or other types of events to a component of the fluid system e.g. to the pump 100, to a local control system (not shown) and/or the like. An example of a leakage detection process that can be performed by the processing unit 310 will be described in more detail below.

Figure 2:
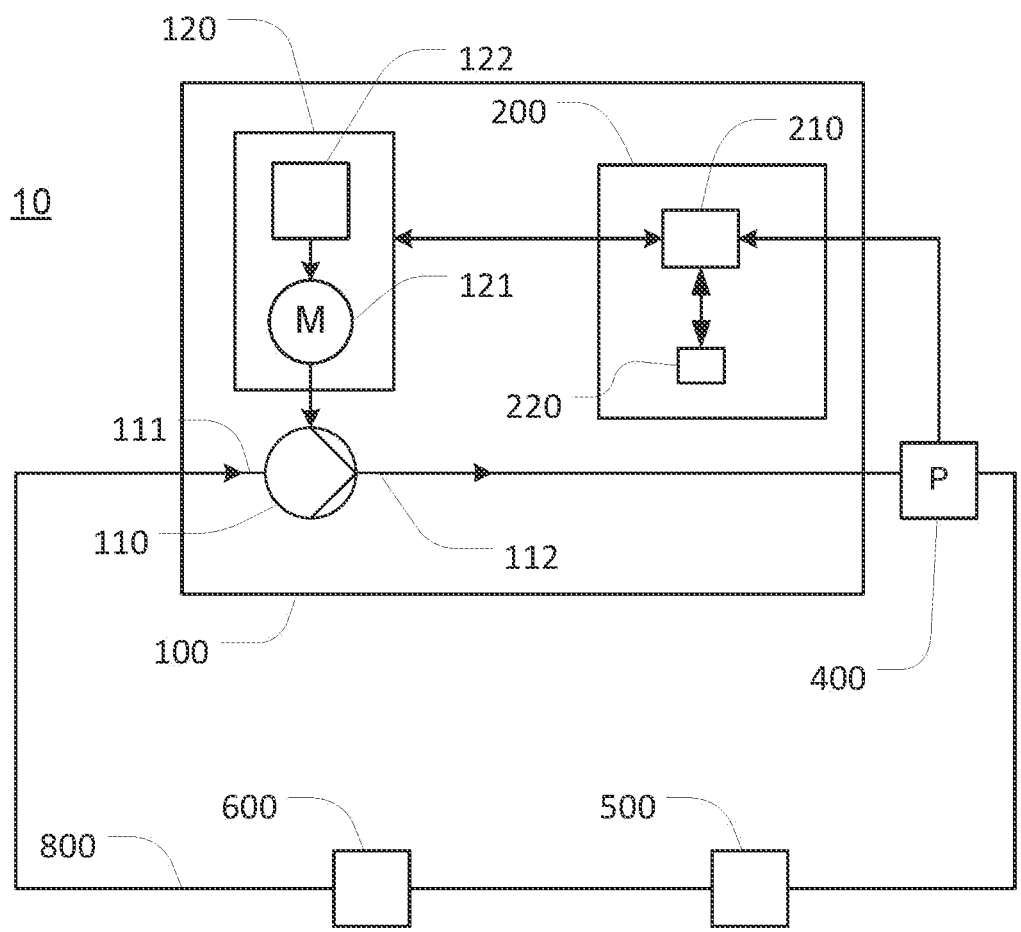
FIG. 2 schematically shows another embodiment of a fluid system.

FIG. 2 schematically illustrates another example of a fluid system 10. The fluid system of FIG. 2 is similar to the system of FIG. 1 in that it also comprises a pump, fluid conduits 800, a pressure sensor 400 and, optionally, other components such as one or more radiators 500, an expansion vessel 600 and/or the like, all as described in connection with FIG. 1. The fluid system of FIG. 2 differs from the system of FIG. 1 in that the pump 100 includes a data processing system in the form of a data processing unit 200 integrated into the pump. The pump 100 further includes a fluid displacement mechanism 110 and a pump drive 120 as described in connection with FIG. 1. The data processing unit 200 may be accommodated into the same housing as the pump drive 120. The data processing unit 200 comprises a suitably programmed processing unit 210, such as a CPU, a microcontroller, a microprocessor, or the like, and a memory 220. The memory may have stored thereon a computer program and/or data for use by the processing unit 210.

The data processing unit 200 may receive a pressure signal indicative of measured pressure values from the pressure sensor 400, either continuously or intermittently, e.g. periodically, e.g. such that the data processing system receives a time series of measured pressure values indicative of a pressure of the fluid at different points in time. The pressure sensor 400 or an intermediary device may transmit the measured pressure signal automatically or upon request from the data processing system. Each pressure value may be associated with a time stamp. The data processing system 200 may further receive additional data from the fluid system. If the pressure sensor 400 is internal to the pump, the data processing unit 200 may receive the pressure signal via an internal interface, e.g. a data bus. If the pressure sensor is external to the pump 100, the data processing unit 200 may receive the measured pressure signal via another suitable wired or wireless interface, e.g. via a direct wired communications link, via a wired or wireless local network and/or the like. For example, the pressure sensor may be integrated into or otherwise connected to another component of the fluid system such as expansion vessel 600, e.g. as described in connection with FIG. 1.

The processing unit 210 is programmed to perform a leakage detection process as described herein, e.g. the leakage detection process described in connection with FIGS. 3-7 below. Upon detection of leakage and/or upon occurrence of another event, e.g. an event triggering a fill warning, the data processing unit 200 may output an alarm or other suitable notification, e.g. via a user-interface of the pump, e.g. by activating a visible or audible alarm indicator. To this end, even though not explicitly shown in the embodiment of FIG. 2, it will be appreciated that the pump may include a user-interface as described in connection with FIG. 1. Alternatively or additionally, the data processing unit may send a leakage alarm or warning and/or other types of events to another component of the fluid system, e.g. to a local control system (not shown), and/or to an external data processing system (not shown). An example of a leakage detection process that can be performed by the processing unit 210 will be described in more detail below.

Figure 3:
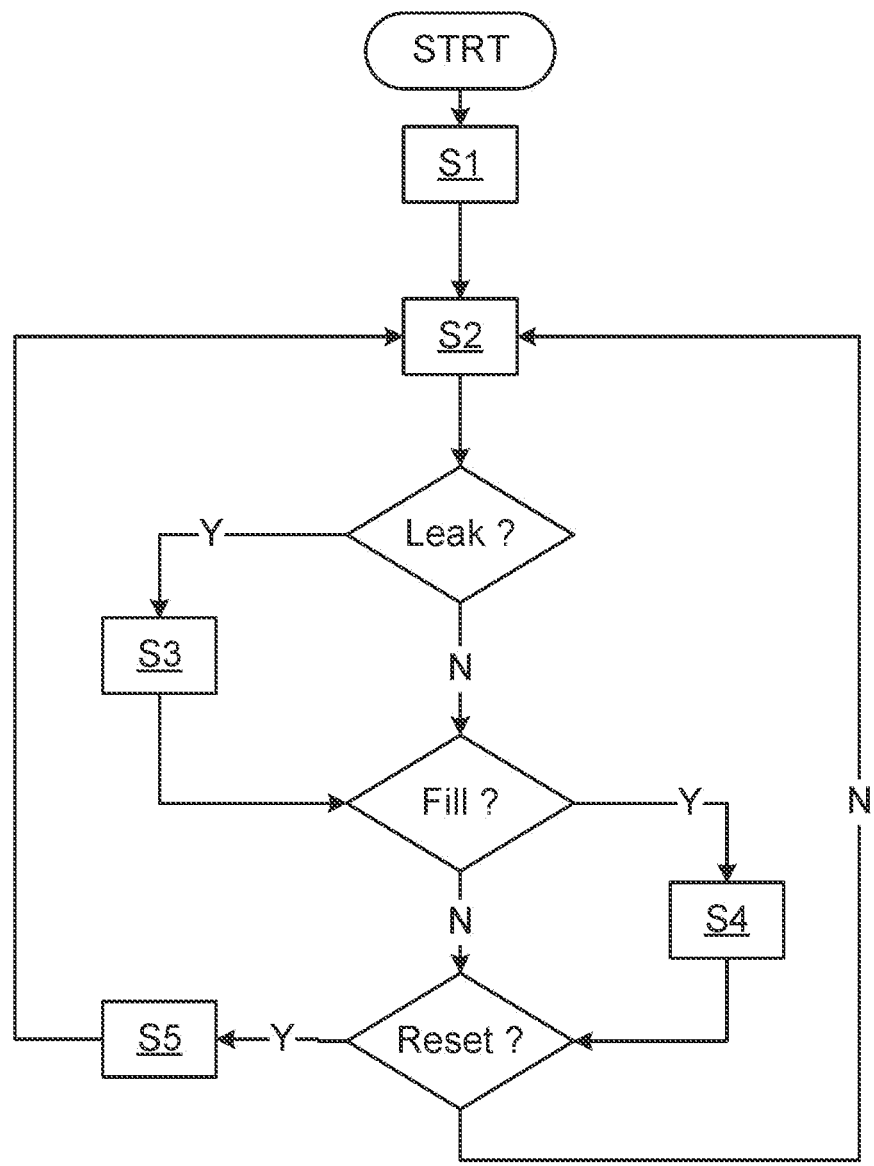
FIG. 3 schematically shows a flow diagram of a method for detecting leakage in a fluid system.

FIG. 3 shows a flow diagram of an embodiment of a leakage detection process for detection of a leak in a closed loop fluid system, e.g. a system as described in connection with FIG. 1 or 2 above. To this end, the process receives a time series of measured pressure values. The pressure values may be measured by a pressure senor of the fluid system and be indicative of a system pressure of the fluid system.

Generally, the system pressure in a fluid system, e.g. a heating or cooling system will vary over time even in the absence of any leaks. Such pressure variations may occur due to a varying system temperature, in particular due to a varying temperature of the fluid. The temperature variations and, consequently, the pressure variations, may include seasonal variations, weekly variations, daily variations and/or variations of a higher frequency. For example, seasonal variations may involve differences between summer and winter, while weekly variations may include variations between working days and weekends and daily variations may include differences between night and day. These and/or other variations may e.g. be caused by the heating system boiler and its control strategy and/or by other operational factors of the fluid system.

Embodiments of the method described herein accommodate for the above and/or other variations of the system pressure. To this end, embodiments of the method described herein detect the temperature-dependent variation of the system pressure in the specific heating system on which it is operating. This is done by basing the leakage detection on a comparison of respective filtered pressure signals, filtered so as to capture variations occurring over respective time scales. In particular, some embodiments estimate the upper and lower limits of the system pressure, also referred to herein as the upper and lower pressure envelope, respectively. The upper and lower envelopes define the pressure variation that is natural for the fluid system, i.e. caused by temperature variations and/or other normal operational variations. As long as the pressure remains inside the envelopes, the heating system is assumed to be without any leakages.

In particular, the process starts with an initialization step S1, where the process initializes various filters, counters as well as initial values of a pressure envelope. For example, the process may sample a predetermined number of pressure values and determine an average value of the sampled values as well as a minimum and a maximum value. The process may determine an initial pressure envelope as extending between the detected minimum and maximum values.

In subsequent step S2, the process receives a pressure signal indicative of measured pressure values of a pressure in the fluid system measured at different points in time. The process may receive pressure values at a constant sampling rate or at a varying sampling rate. Based on the received pressure values, the process computes two filtered pressure signals, namely a fast averaged version of the system pressure and slow averaged version. Hence the filtered pressure signals are indicative of variations of the measured pressure values over respective time scales: The fast-averaged version captures variations over short time scale while the slow averaged version only captures variations over a longer time scale. In some embodiments, the process may perform one or more optional pre-processing steps on the pressure signal, e.g. for noise reduction, outlier removal, scaling and/or the like. In some embodiments, the process may optionally perform a temperature-dependent scaling or other temperature-dependent compensation of the measured pressure signal, e.g. based on a measured system temperature. While embodiments of the present leakage detection process may be applied without such temperature-dependent compensation, a temperature-dependent compensation of the received pressure signal may further increase the reliability of the leakage detection.

Each filter may be low pass filter having a respective cut-off frequency and an associated time constant which defines the time scale of the respective filtered signals. The time constant may be designated $\tau$ and defined as $\tau=2\pi/f_c$, where $f_c$ denotes the cut-off frequency of the low-pass filter. In particular, a first filtered signal may be calculated by a first low-pass filter having a first time constant. A second filtered signal may be calculated by a second low-pass filter having a second time constant time, smaller than the first time constant. Hence, the second low-pass filter has a second cut-off frequency higher than a first cut-off frequency of the first low-pass filter. For example, the second time constant of the second low-pass filter may be between 5% and 80% of the first time constant of the first low-pass filter, such as between 10% and 75%, such as between 25% and 70%, such as between 40% and 60%.

The first time constant may be between 2 weeks and 3 months, such as between 2 weeks and 2 months, such as about 1 month. The second time constant may be between 1 day and 1 month, such as between 3 days and 3 weeks, such as between 1 week and 2 weeks.

In some embodiments, each of the first and second low-pass filters implements an exponential moving average having different smoothing factors. In some embodiments, other types of averaging may be used, e.g. a sliding window averaging where the low-pass filters implement different window sizes.

Generally, the first filtered signal may represent a first averaged signal representing an average of the received pressure signal over the first time scale, or otherwise represent variations of the received pressure signal over the first time scale. The second filtered signal may represent a second averaged signal representing an average of the received pressure signal over the second time scale, or otherwise represent variations of the received pressure signal over the second time scale. The first time scale may be between 2 weeks and 3 months, such as between 2 weeks and 2 months, such as about 1 month. The second time constant may be between 1 day and 1 month such as between 3 days and 3 weeks, such as between 1 week and 2 weeks.

The process further compares the first filtered pressure signal and the second filtered pressure signal. In particular, the process computes a width of an operating range of the measured pressure values relative to the first filtered pressure signal, i.e. relative to the slowly varying filtered signal. The width may be defined as a difference between the first filtered pressure signal and one of the upper and lower envelopes. The process then computes a deviation of the second filtered pressure signal from the first filtered pressure signal and compares the computed deviation with the computed width of the operating range. When the second filtered pressure signal is smaller than the first filtered pressure signal by a deviation larger than the width of the operating range—optionally subject to one or more additional trigger conditions—the process may register this as a leakage-indicating event. The process may output a leakage warning responsive to a single leakage-indicating event having occurred or, alternatively, responsive to multiple leakage-indicating events having occurred, in particular when the large deviation occurs repeatedly and/or over an extended period of time, e.g. over several days or weeks.

Figure 6:
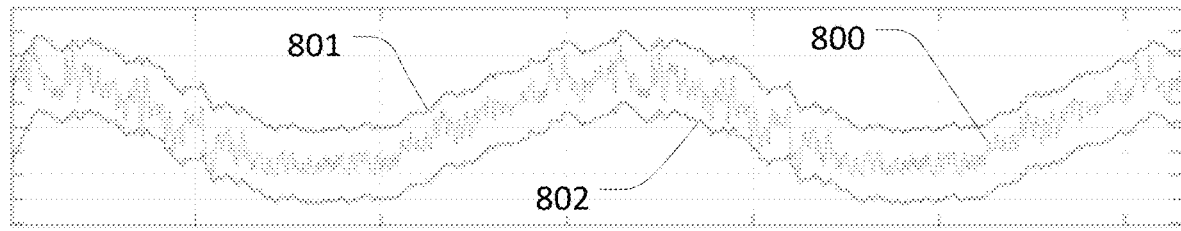
FIG. 6 schematically shows examples of pressure values and a computed pressure envelope.

FIG. 6 shows an example of a measured pressure signal and corresponding envelopes. In particular, FIG. 6 shows a measured pressure signal 800 of a heating system in the absence of any leak over a measurement period of about two years. It can be seen that the signal 800 shows a seasonal variation as well as higher frequency variations within an operating range defined by an upper envelope 801 and a lower envelope 802.

Figure 7:
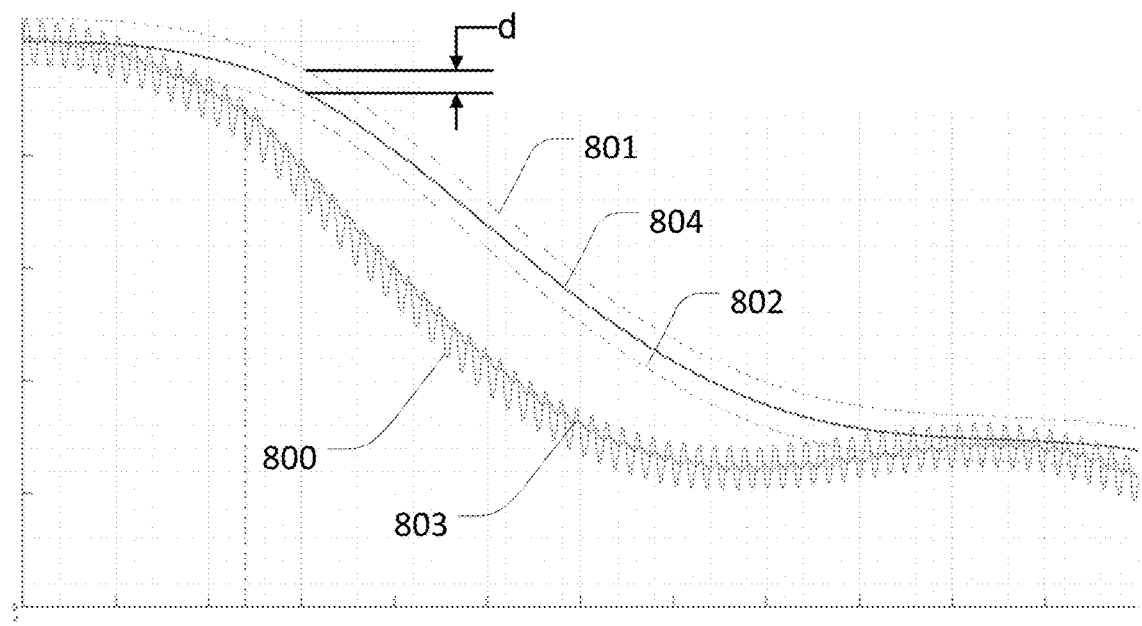
FIG. 7 schematically shows an example of pressure data in connection with a leak in a fluid system.

FIG. 7 shows an example of a simulation of a measured pressure signal and corresponding envelopes. In particular, FIG. 7 shows a simulation of a measured pressure signal 800 over a measurement period of about one year after occurrence of a simulated leak. Moreover, FIG. 7 shows a first low-pass filtered signal 804 indicative of variations of the measured pressure signal 800 over a long time scale, in particular over a time scale of several months. FIG. 7 further shows a second low-pass filtered signal 803 indicative of variations of the measured pressure signal 800 over a shorter time scale of several weeks. FIG. 7 further shows an upper envelope 801 and a lower envelope 802 showing a detected normal operational range of the pressure signal around the first low-pass filtered signal 804. The operational range has a width d.

As can be seen from FIG. 7, the second low-pass filtered signal 803 decreases faster than the first low-pass filtered signal 804 and deviates from the first low-pass filtered signal by a deviation larger than the width d of the operating range, thus indicating the presence of a leak in the system. In the simulated example of FIG. 7, the envelope width d has settled to a minimum width and is thus not further reduced even though the measured pressure signal decreases.

Again referring to FIG. 3, based on the comparison between the first and second filtered signals, the process determines whether a leakage warning is to be output (step S3). For example, the process may issue a leakage warning responsive to the second filtered pressure signal deviating from the first filtered pressure signal by a deviation that is larger than the envelope width, optionally subject to one or more additional trigger conditions. In other embodiments, the process may increment a leakage-indicator counter responsive to the second filtered pressure signal deviating from the first filtered pressure signal by a deviation that is larger than the envelope width, optionally subject to one or more additional trigger conditions. When the leakage-indicator counter reaches a predefined counter value, the process may output a leakage warning. The predetermined counter value may be 1 or larger than 1. An example of the detection process will be described in more detail with reference to FIG. 4. Examples of additional trigger conditions include a comparison of the current second filtered pressure signal with a previous value of the first filtered pressure signal, e.g. a delayed version of the first filtered pressure signal. The delayed version of the first filtered pressure signal may be delayed by a suitable delay, such as a predetermined delay, e.g. by a delay selected between 2 weeks and 6 weeks, such as between 4 weeks and 5 weeks. Such additional trigger condition may reduce the risk that the observed current deviation of the second filtered pressure signal larger than the envelope width is a result of a short-time fluctuation and correspond to a false positive leakage indication.

In some embodiments, the process may detect alternative or additional trigger conditions and/or leakage-indicating events, e.g. based on a rate of change (e.g. the gradient) of the second filtered pressure signal relative to the first filtered pressure signal and/or relative to the computed envelope.

Still referring to FIG. 3, the process may further determine whether a fill warning should be output, a fill warning being indicative that the system pressure has fallen below a minimum level such that fluid should be added to the fluid system. In particular, the process may detect when the lower envelope 802 falls below a predetermined threshold, e.g. a minimum pressure of 1 bar or another suitable minimum threshold which may depend on the particular fluid system. In some embodiments, the threshold may be defined relative to a peak average value, e.g. as 40% of the peak average value. In any event, if the lower envelope falls below a predetermined threshold, the process may issue a fill warning (step S4). When the fill warning is based on the lower envelope false warnings due to isolated outliers are avoided while providing a sufficiently early filling warning.

In some embodiments, if the generated leakage warning and a fill warning occur concurrently or within a predetermined time window, the process may raise an alarm, e.g. an acoustic alarm, as the presence of both warnings is a strong indication of the presence of a leak that affects normal operation of the system.

In some embodiments, the process may implement a mechanism for automatically resetting the leakage warning and/or the fill warning (step S5). For example, the process may decrement or reset the leakage-indicator counter used for leakage detection when the counter has not been incremented for a certain period of time. The leakage warning may automatically be reset when the leakage-indicator counter has been reset or has been decremented below a corresponding threshold. Similarly, the process may reset a fill warning when the lower envelope again increases above the threshold for issuing a fill warning. It will be appreciated that different embodiments may implement different strategies for automatic resetting of leakage and/or fill warnings and some embodiments may not perform any automatic resetting at all. In some embodiments, automatic reset may be suppressed when a leakage warning and a fill warning are output concurrently.

Finally, the process returns to step S2 and continues the computation of filtered signals and the leak and filling detection.

Figure 4:
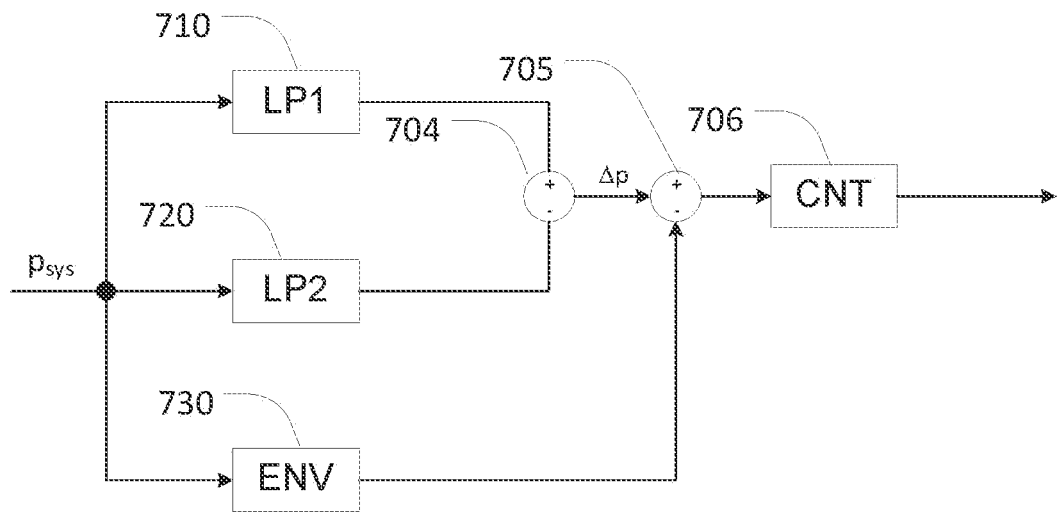
FIG. 4 schematically shows a flow diagram of a method for detecting leakage-indicating events indicative of leakage in a fluid system.

FIG. 4 schematically shows a flow diagram of a method for detecting leakage-indicating events indicative of a leak in a fluid system. The process receives the measured pressure signal $p_{sys}$. The process applies a first low-pass filter 710 and a second low pass filter 720 as described in connection with FIG. 3. The process further determines upper and lower envelopes 730 indicative of a normal operational range of the pressure signal. The process computes a deviation 704 between the first and second filter signals and, in subsequent block 705, compares the computed deviation with a width of the computed operational range. If the deviation exceeds the width of the normal operational range, the process increments a counter 706. In some embodiments, the process increments the counter 706 only if one or more additional trigger conditions are fulfilled, e.g. only when the deviation is larger than the width for at least a number of time steps, and/or only when the rate of change of the second filtered pressure signal exceeds a threshold, and/or only when the second filtered pressure signal also deviates from a delayed version of the first filtered pressure signal—delayed by a suitable delay, such as 30 days—by more than the envelope width.

It will be appreciated that the upper and lower envelopes 730 may be computed in different ways, e.g. using a conventional envelope detector known as such in the art. One example of computing the envelope will be described with reference to FIG. 5 below. In some embodiments, the process computes the upper envelope by applying an envelope detector to the measured pressure signal or to a filtered version of the measured pressure signal. The process may then compute a lower envelope by mirroring the computed upper envelope relative to the first filtered signal.

It will further be appreciated that the comparison at block 705 between the deviation and the width of the operational range may be performed in different ways. For example, in some embodiments, the counter is incremented when the deviation is larger than the width. In other examples, the counter is incremented when the deviation is larger than the width multiplied by a scaling factor. Yet further, in some embodiments, the counter may only be incremented when one or more additional trigger conditions are fulfilled, e.g. as described above. When the counter reaches a predetermined maximum threshold, the process outputs a leakage warning.

Figure 5:
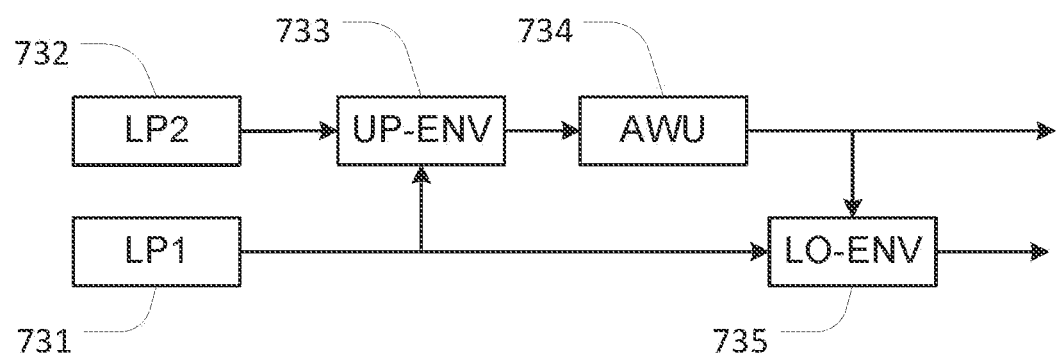
FIG. 5 schematically shows a flow diagram of a method for computing a pressure envelope.

FIG. 5 schematically shows a flow diagram of a method for computing a pressure envelope. The envelope is detected based on two signals, each computed from the received measured pressure signal. In the example of FIG. 5, the computation of the envelope is based on a first low-pass filtered signal 731 and a third signal 732. The first low-pass filtered signal may be the same first low-pass filtered signal that is also used for the purpose of leakage detection as described in connection with FIG. 3. The third signal may be the received measured pressure signal or a suitably filtered signal. In particular, the third signal 732 may be a third low-pass filtered signal indicative of variations of the measured pressure signal at shorter time scale than the first low-pass filtered signal. The third low-pass filtered signal may be the same signal as the second low-pass filtered signal that is also used for the purpose of leakage detection as described in connection with FIG. 3. Alternatively, the third low-pass filtered signal may be indicative of variations of the measured pressure signal at shorter time scale than the second low-pass filtered signal, e.g. at a time scale between 1 h and 3 days.

At block 733, the process detects an upper envelope, e.g. upper envelope 801 of FIG. 6. The upper envelope is indicative of an upper envelope of the short-term pressure variations represented by the third signal 732 relative to the long-term average pressure as represented by the first filtered pressure signal 731. For example, the process may determine the upper envelope based on a low-pass filtered difference between the first filtered signal and the third signal where the difference is suitably scaled and/or thresholded so as to only represent positive differences, i.e. upward deviations of the fast varying signal relative to the slowly varying signal. Moreover, the low-pass filtered difference may be low-pass filtered with a sufficiently small cut-off frequency so as to prevent short-term fluctuations from influencing the computed envelope width. In one embodiment, the process may initially set the envelope width to an initial value, and increase the envelope width responsive to the third signal exceeding the upper envelope.

Optionally, at block 734, an auto-wind-down function is applied so as to prevent the detected envelope from increasing over time. For example, to this end, the process may reduce the envelope width gradually when the computed width exceeds a predetermined threshold. The auto-wind-down function may thus prevent an undesired wind-up of the envelope width without reducing the envelope width below a minimum envelope width.

At block 735, the process computes the lower envelope, e.g. lower envelope 802 in FIG. 6, by mirroring the computed upper envelope relative to the first filtered signal. Accordingly, the process avoids the computed lower envelope to be increasingly lower in the presence of a leak which would reduce the detectability of the leak.

Embodiments of the method described herein may be computer-implemented. In particular, embodiments of the method may be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A method for detecting leakage in a fluid system, comprising:
   receiving a pressure signal indicative of measured pressure values of a pressure in the fluid system measured at different points in time;
   determining a first filtered pressure signal indicative of variations of the measured pressure values over a first time scale;
   determining a second filtered pressure signal indicative of variations of the measured pressure values over a second time scale, shorter than the first time scale;
   computing a width between an upper envelope of an operating range of the measured pressure values and the first filtered pressure signal, wherein the operating range defines the upper envelope, larger than the first filtered pressure signal, and a lower envelope, smaller than the first filtered pressure signal;
   computing a deviation of the second filtered pressure signal from the first filtered pressure signal;
   outputting a leakage warning based at least in part on a comparison of the computed deviation and the computed width; and
   computing the lower envelope from the first filtered pressure signal and from the computed width.

2. A method according to claim 1, wherein outputting the leakage warning comprises detecting occurrence of one or more leakage-indicating events, the occurrence of each leakage-indicating event including the second filtered pressure signal having a value smaller than the lower envelope.

3. A method according to claim 1, wherein computing the lower envelope comprises computing the lower envelope by subtracting the computed width from the first filtered pressure signal.

4. A method according to claim 1, further comprising: outputting a filling warning when the lower envelope is smaller than a predetermined threshold or smaller than 1 bar.

5. A method according to claim 1, wherein outputting the leakage warning comprises:
   detecting one or more leakage-indicating events,
   counting a number of detected leakage-indicating events, and
   outputting the leakage warning based on the counted number of detected leakage-indicating events, or responsive to the counted number exceeding a threshold.

6. A method according to claim 1, wherein determining the first filtered pressure signal comprises applying a first low-pass filter having a first time constant to the measured pressure signal, and wherein determining the second filtered pressure signal comprises applying a second low-pass filter having a second time constant to the measured pressure signal, the second low-pass filter allowing higher frequencies to pass than the first low-pass filter.

7. A method according to claim 1, comprising gradually reducing the envelope width when the computed width exceeds a predetermined threshold.

8. A method for detecting leakage in a fluid system, comprising:
   receiving a pressure signal indicative of measured pressure values of a pressure in the fluid system measured at different points in time;
   determining a first filtered pressure signal indicative of variations of the measured pressure values over a first time scale;
   determining a second filtered pressure signal indicative of variations of the measured pressure values over a second time scale, shorter than the first time scale;
   computing a width between an upper envelope or a lower envelope of an operating range of the measured pressure values relative to the first filtered pressure signal, wherein the operating range defines the upper envelope, larger than the first filtered pressure signal, and the lower envelope, smaller than the first filtered pressure signal;

computing a deviation of the second filtered pressure signal from the first filtered pressure signal; and outputting a leakage warning based at least in part on a comparison of the computed deviation and the computed width.

9. A method according to claim 8, comprising gradually reducing the envelope width when the computed width exceeds a predetermined threshold.

10. A method according to claim 8, wherein computing the width comprises computing the width as a width between the upper envelope and the first filtered pressure signal.

11. A method according to claim 10, wherein the method further comprises computing the lower envelope from the first filtered pressure signal and from the computed width.

12. A method according to claim 11, wherein computing the lower envelope comprises computing the lower envelope by subtracting the computed width from the first filtered pressure signal.

13. A method according to claim 12, wherein computing the width of the operating range comprises computing the upper envelope from the measured pressure signal and computing the width as a difference between the computed upper envelope and the first filtered pressure signal.

14. A method according to claim 8, wherein outputting the leakage warning comprises detecting occurrence of one or more leakage-indicating events, occurrence of each leakage-indicating event including the second filtered pressure signal having a value smaller than the lower envelope.

15. A data processing system configured to perform the steps of the method defined in claim 1.

16. A pump for use in a fluid system, the pump comprising a processing unit configured to control operation of the pump; wherein the processing unit is further configured to perform the steps of the method defined in claim 15.

17. A fluid system comprising a pressure sensor and a data processing system communicatively coupled to the pressure sensor; wherein the data processing system is configured to perform the steps of the method defined in claim 15.

18. A computer program comprising computer program code configured, when executed by a data processing system, to cause the data processing system to perform the steps of the method according to claim 15.

19. A method for detecting leakage in a fluid system, comprising:
 receiving a pressure signal indicative of measured pressure values of a pressure in the fluid system measured at different points in time;
 determining a first filtered pressure signal indicative of variations of the measured pressure values over a first time scale;
 determining a second filtered pressure signal indicative of variations of the measured pressure values over a second time scale, shorter than the first time scale;
 computing a width between a lower envelope of an operating range of the measured pressure values and the first filtered pressure signal, wherein the operating range defines an upper envelope, larger than the first filtered pressure signal, and the lower envelope, smaller than the first filtered pressure signal;
 computing a deviation of the second filtered pressure signal from the first filtered pressure signal; and
 outputting a leakage warning based at least in part on a comparison of the computed deviation and the computed width.

* * * * *